United States Patent

Jacobs

[11] 4,089,603
[45] May 16, 1978

[54] APPARATUS FOR SUPPORTING A PRINTING PLATE FOR EXPOSURE

[75] Inventor: Robert D. Jacobs, Geneseo, N.Y.

[73] Assignee: Itek Corporation, Lexington, Mass.

[21] Appl. No.: 742,322

[22] Filed: Nov. 16, 1976

[51] Int. Cl.² ............................................. G03B 27/60
[52] U.S. Cl. ................................ 355/73; 248/441 R; 248/362; 248/363; 355/87; 355/91
[58] Field of Search ...................... 355/73, 76, 91, 87, 355/94, 113; 248/362, 363, 441 R

[56] References Cited

U.S. PATENT DOCUMENTS

| | | | |
|---|---|---|---|
| 3,547,537 | 12/1970 | Betron | 355/87 X |
| 3,644,039 | 2/1972 | Boyer | 355/73 X |
| 3,826,572 | 7/1974 | Duerr | 355/91 X |

*Primary Examiner*—Richard A. Wintercorn
*Attorney, Agent, or Firm*—Homer O. Blair; Robert L. Nathans; Gerald H. Glanzman

[57] ABSTRACT

Apparatus for supporting a sheet of photosensitive material in the image plane of an optical imaging system for exposure thereat. The apparatus includes a first cover plate assembly having a transparent cover plate and a second backing plate assembly including a relatively flexible backing sheet. The cover plate assembly is driven into contact with the backing plate assembly with the photosensitive sheet to be exposed supported therebetween such that an air-tight chamber is defined between the cover plate assembly and the relatively flexible backing sheet. The air-tight chamber is then evacuated through the cover plate assembly, and as it is evacuated, the flexible backing plate will be sucked towards the cover plate assembly and drive the photosensitive sheet into firm contact with the transparent cover plate.

By the use of the flexible backing plate, the chamber can be evacuated very rapidly, for example, in two or three seconds. Also, since the photosensitive sheet is not supported against a rigid back plate as in the prior art, an optically flat back surface is not required.

15 Claims, 1 Drawing Figure

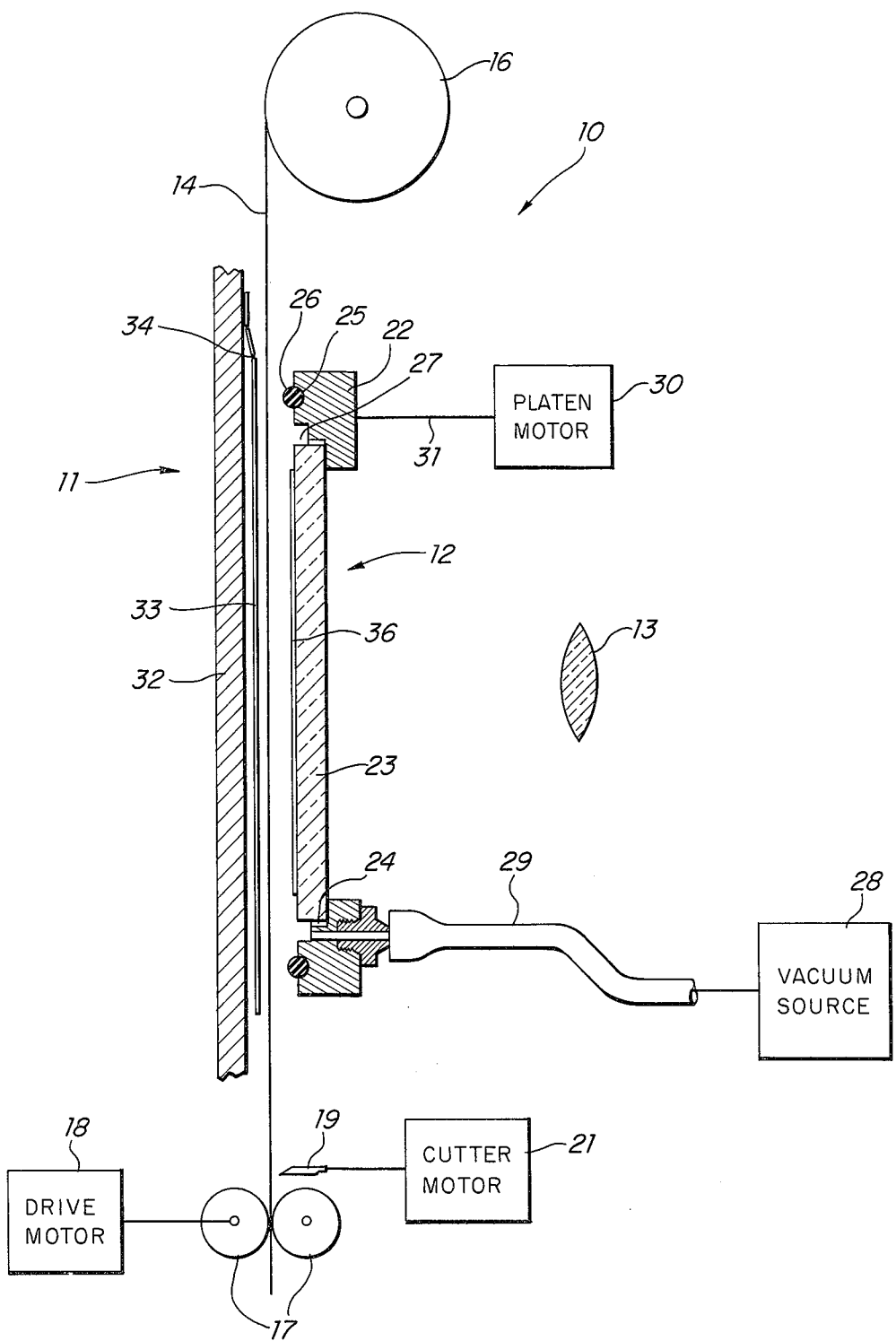

APPARATUS FOR SUPPORTING A PRINTING PLATE FOR EXPOSURE

BACKGROUND OF THE INVENTION

1. Field of the Invention

The present invention relates generally to the platemaking field, and, more particularly, to a high speed vacuum support assembly for supporting a printing plate in the imaging station of a platemaker during the exposure thereof.

2. Description of the Prior Art

In platemaking apparatus, for example, as used in automatic duplicating machines or the like, a photosensitive printing plate is fed to the imaging station of the platemaker, positioned in the image plane of the optical imaging system, and then exposed to an original document. During exposure, it is, of course, imperative that the plate be supported very accurately in the image plane, and a variety of systems are known in the prior art to accomplish this. One of the most common types of systems comprises a vacuum support system wherein the plate is positioned on a support platen and covered by a glass plate to form an air-tight chamber. Air is then withdrawn from the chamber through a plurality of apertures in the support platen, and, as the air is withdrawn, the printing plate will be pressed and held firmly against the support platen for imaging.

There are several disadvantages to such a system. Initially, substantial time is required to fully evacuate the chamber, for example, a couple of minutes. This is because it is necessary that essentially all the air be removed from the chamber to eliminate any air bubbles because the presence of air bubbles can prevent the printing plate from sitting completely flat against the support platen. In addition, because the vacuum is formed between a glass cover plate and the support platen and drawn through the support platen, the glass cover plate will be placed under a significant amount of stress which can result in its being slightly deformed. Since the printing plate is imaged through the glass, this is unacceptable and the prior art frequently employs heavy, thick glass to minimize distortion. This, however, will reduce the amount of light that can pass through the glass which is also an undesirable situation. Furthermore, because the printing plate is pressed against the support platen during imaging, the platen must be optically flat which is relatively difficult to achieve.

Yet, other inadequacies exist in these prior art systems. For one thing, they are not very suitable for systems wherein the imaging station is in a vertical orientation. Also, they are usually not well designed to permit rapid insertion or removal of half-tone screens or other masking plates into the optical system.

BRIEF SUMMARY OF THE INVENTION

By the present invention, a novel, high speed vacuum support assembly for platemakers is provided which obviates many of the above-described inadequacies. In accordance with the present invention, the vacuum support platen is eliminated and instead, the vacuum system is incorporated into the moveable glass cover plate assembly that is moved into contact with the plate to be imaged. Specifically, a length of plate material, preferably from a supply roll, is positioned in a space defined by a back plate assembly and a glass cover plate assembly. After being so positioned, the cover plate assembly is moved into air-tight contact with the back plate assembly, and a vacuum is drawn in the chamber so formed. More specifically, the back plate assembly includes a semi-rigid somewhat flexible sealing sheet, and the chamber is actually formed between this semi-rigid sheet and the glass cover plate. As the air is withdrawn from this chamber, the semi-rigid flexible sheet will be drawn into contact with the glass cover plate and, in doing so, press the printing plate firmly against the glass to be imaged.

Because of the flexibility of the sheet, it will rapidly move against the glass cover plate and force air out of the chamber, for example, in a couple of seconds. Furthermore, because of its flexibility and because it is sucked against the cover plate rather than vice versa, very little stress will be put on the glass cover plate. Thus, it will remain very flat to ensure accurate positioning of the printing plate against it and in the image plane of the optical system. Also, because not much stress will be placed on it, a relatively thin, highly transparent glass can be used to ensure it will not interfere with the image quality of the printing plate. Also, because the glass plate is used as the support platen rather than a back plate as in the prior art, an optically flat back plate is not required, and, thus, manufacturing requirements are eased.

In addition, with the present invention, contact halftone screens or other masking units can be easily attached to the glass cover plate for incorporation into the system. Further details of the invention will be set out hereinafter in conjunction with the description of the drawings.

BRIEF DESCRIPTION OF THE DRAWING

The FIGURE illustrates, in somewhat schematic cross-sectional form, the vacuum support assembly according to a presently most preferred embodiment of the invention.

DETAILED DESCRIPTION OF THE PREFERRED EMBODIMENT

The FIGURE illustrates the imaging station 10 of a platemaker accordingly to a presently most preferred embodiment of the invention. Imaging station 10 is illustrated as being vertically oriented in accordance with the presently most preferred embodiment, although it should be understood that the invention is not limited to such an orientation. Station 10 generally consists of a stationary back plate assembly 11, a moveable cover plate assembly 12 and an optical imaging system schematically illustrated by lens 13.

A length of printing plate material 14 to be exposed is fed from a supply roll 16 through a gap formed between the back plate assembly 11 and the moveable cover plate assembly 12 via drive rollers 17 driven by drive motor 18. A cutter 19 driven by cutter motor 21 is supported adjacent the drive rollers to cut the plate from the web after imaging. Although the invention is designed primarily for use in systems employing plate material fed from a web, this is not essential and it should not be so limited.

The plate assembly 12 consists of a generally rectangular frame 22 for supporting a rectangular glass cover plate 23 around its periphery. Glass cover plate 23 is secured to frame 22 in an air-tight manner via appropriate sealing means 24. Also supported on frame 22, in a semi-circular groove 25, is a sealing gasket 26 of, for example, light foam neoprene rubber. Gasket 26 extends completely around frame 22 so as to form an air-tight seal with back plate assembly 11 as will be explained hereinafter. Frame 22 is also designed to define an annular vacuum trough 27 which surrounds the periphery of glass plate 23 and which is coupled to an appropriate vacuum source 28 via flexible coupling 29 as illustrated.

Cover plate assembly 12, comprising frame 22 and glass plate 23 is adapted to be moved horizontally toward and away from back plate assembly 11 by platen drive motor 30 via an appropriate mechanical coupling illustrated schematically by line 31.

Back plate assembly 11 comprises a rigid backing plate member 32 and a semi-rigid flexible plastic sheet 33 hingedly attached to backing plate member 32 via hinge 34 so as to hang freely suspended from the backing plate 32. Sheet 33 may be constructed of any one of a variety of materials, however, in the preferred embodiment it comprises a black semi-rigid plastic sheet having a thickness of 30–40 thousandths of an inch. A suitable material is Carlson Contact Backing Sheet manufactured by the Chelsea S. Carlson Co. of Minneapolis, Minnesota.

The system operates as follows. With the apparatus in the position illustrated in the FIGURE, a length of printing plate 14 is fed from roller 16 between assemblies 11 and 12 and between drive rollers 17. Platen motor 30 is then actuated to move cover plate assembly 12 to the left in the FIGURE and firmly into contact with back plate assembly 11 with the printing plate held therebetween. Specifically, gasket seal 26 will engage flexible sheet 33 and push it against rigid back plate member 32 until a rectangular air-tight chamber or compartment is formed that has its side faces defined by flexible sheet 33 and glass plate 23 and its periphery defined by gasket seal 26.

Vacuum source 28 is then actuated to withdraw air from this chamber via flexible coupling 29 and annular vacuum trough 27. As a vacuum condition is created in trough 27, and in the chamber, flexible sheet 33 will be sucked toward the glass plate 23, and, as it does so, it will push the printing plate (which is narrower than the chamber and thus clamped only at the top and the bottom by gasket 26) against glass plate 23. Furthermore, since the flexible sheet is clamped against backing plate 32 all around gasket 26, the sheet will tend to bow so that the center of the sheet will first contact central portions of the glass plate such that air will be withdrawn from the chamber from the center outwardly towards the edge and, in this way, prevent any air pockets from forming in the chamber. As more and more air is withdrawn from the chamber, therefore, the plastic sheet 33 will press the printing plate 14 firmly against glass plate 23 and very flatly in the image plane of the optical system 13 defined by glass plate 23.

The printing plate is finally exposed through optical system 13, the vacuum is broken, and the platen motor 30 is actuated to move cover plate assembly 12 towards the right in the FIGURE away from the backing plate assembly 11. Drive motor 18 is then actuated to drive the exposed plate section downwardly to be cut from the web by cutter 19 and, concurrently, to position the next length of printing plate for imaging.

By utilizing the glass cover plate as the vacuum platen and by forming the vacuum between the glass cover plate and a flexible sheet, several significant advantages are attained. Initially, back plate 32 does not define the image plane of the optical system and thus need not be particularly flat or precise. This simplifies the manufacturing operation because it is much easier to make the glass cover plate flat than the back plate. Furthermore, since during evacuation of the chamber, a thin flexible sheet 33 is sucked against glass plate 23, the stresses on the glass plate 23 will be minimal. Thus, it will not tend to deform which would affect its optical quality. This makes it unnecessary to use heavy, thick glass with its greater cost and reduced light transmissivity as required in many prior art systems.

In addition, and perhaps, most importantly, the use of flexible sheet 33 permits evacuation to take place much quicker than in the prior art. For example, in the typical prior art system, complete evacuation of the vacuum chamber may require as much as two or three minutes, while with the present invention, only two or three seconds is necessary. This obviously results in a significant improvement in operating efficiency. Also, by the use of the flexible sheet, the likelihood of air bubbles forming between the printing plate and the glass is minimized.

Finally, the present invention readily lends itself to the utilization of half-tone and other contact masks or screens. In the FIGURE, a contact screen 36 is illustrated as being directly secured to the inner face of glass sheet 23. When the chamber is evacuated, the printing plate 14 will be pressed firmly in contact with screen 36 and, thus, be immediately ready for half-tone imaging operations. By the present invention, screen 33 can also easily be removed or replaced with different kinds of masks.

While what has been described is a presently most preferred embodiment, it should be recognized that the invention could take many other forms. Accordingly, it should be understood that the invention should be limited only insofar as required by the scope of the following claims.

What is claimed is:

1. Optical imaging apparatus comprising:
   A. an imaging station including an optical imaging system having an image plane; and,
   B. means for supporting a photosensitive sheet in the image plane of said optical imaging system for exposure thereat, said supporting means comprising:
      a. a cover plate assembly including a cover plate means;
      b. a backing plate assembly including a relatively rigid backing plate member and a relatively flexible sheet;
      c. means for producing relative movement between said cover plate assembly and said backing plate assembly to bring them into contact with one another with said photosensitive sheet supported therebetween, said cover plate assembly including means for clamping said relatively flexible sheet against said relatively rigid backing plate member to define an air-tight chamber between said cover plate assembly and said relatively flexible sheet; and,
      d. means for evacuating said chamber, the evacuation of said chamber causing said relatively flexible sheet to be moved towards said cover plate assembly to push said photosensitive sheet firmly against said cover plate means whereby said photosensitive sheet will be held flat against said cover plate means and in said image plane of said optical imaging system for exposure.

2. Apparatus as recited in claim 1 wherein said cover plate assembly comprises:
 a. frame means;
 b. said cover plate means being supported by said frame means around its periphery; and,
 c. wherein said clamping means comprises gasket means supported on said frame means for contacting said relatively flexible sheet for defining an air-tight chamber with said relatively flexible sheet.

3. Apparatus as recited in claim 2 wherein said frame means further includes vacuum trough means surrounding the periphery of said cover plate means and open to said chamber, and wherein said evacuating means comprises a vacuum source and coupling means coupling said vacuum source to said vacuum trough means for evacuating said chamber, said chamber being evacuated in such a manner that said flexible sheet will bow in the center to withdraw air from such chamber from central portions of said chamber outwardly towards the edge to prevent the formation of air bubbles between said photosensitive sheet and said cover plate means.

4. Apparatus as recited in claim 3 wherein said cover plate means comprises a transparent cover plate, and wherein said optical imaging system exposes said photosensitive sheet through said transparent cover plate.

5. Apparatus as recited in claim 2 wherein said means for producing relative movement between said cover plate assembly and said backing plate assembly comprises drive means for driving said cover plate assembly into intimate contact with said backing plate assembly.

6. Apparatus as recited in claim 2 wherein said relatively flexible sheet is hingedly connected to said backing plate member, and wherein said gasket means clamps said relatively flexible sheet against said backing plate member.

7. Apparatus as recited in claim 6 wherein said relatively flexible sheet comprises a semi-rigid plastic sheet having a thickness of about 30–40 thousandths of an inch.

8. Apparatus as recited in claim 6 wherein said photosensitive sheet is fed from a roll of sheet material, and wherein said apparatus further includes drive means for driving a length of photosensitive sheet between said backing plate assembly and said cover plate assembly to be supported therebetween for exposure.

9. Apparatus as recited in claim 8 wherein said cover plate means includes a transparent cover plate and a contact scree attached to said transparent cover plate for intimately contacting said photosensitive sheet sucked thereagainst for producing half-tone prints.

10. Platemaking apparatus comprising:
 A. a vertically oriented imaging station including an optical imaging system having an image plane;
 B. means for supporting a roll of photosensitive printing plate material;
 C. means for feeding a length of printing plate material from said roll into said imaging station; and,
 D. means for supporting said length of printing plate material in the image plane of said optical imaging system for exposure thereat; said supporting means comprising:
  a. a cover plate assembly including a cover plate means;
  b. a backing plate assembly including a relatively rigid backing plate member and a relatively flexible backing sheet;
  c. means for producing relative motion between said cover plate assembly and said backing plate assembly to bring them into contact with one another for supporting said photosensitive sheet therebetween, said cover plate assembly including means for clamping said relatively flexible backing sheet against said relatively rigid backing plate member to define an airtight chamber between said cover plate assembly and said relatively flexible sheet with said cover plate means of said cover plate assembly being positioned in the image plane of said-optical imaging system; and,
  d. means for evacuating said chamber, the evacuation of said chamber causing said relatively flexible backing sheet to be moved towards said cover plate means for pushing said photosensitive sheet firmly against said cover plate means to be held flatly thereagainst and in said image plane of said optical imaging system for exposure.

11. Apparatus as recited in claim 10 wherein said evacuating means comprises:
 a. a vacuum source; and,
 b. means coupling said vacuum source to said cover plate assembly.

12. Apparatus as recited in claim 11 wherein said cover plate assembly comprises:
 a. frame means;
 b. said cover plate means being supported by said frame means around its periphery; and,
 c. wherein said clamping means comprises gasket means supported on said frame means for contacting said relatively flexible sheet for defining an air-tight chamber with said relatively flexible sheet.

13. Apparatus as recited in claim 12 wherein said frame means further includes vacuum trough means surrounding the periphery of said cover plate means and open to said chamber, said vacuum trough means being coupled to said vacuum source for evacuating said chamber, said chamber being evacuated in such a manner that said flexible sheet will bow in the center to withdraw air from such chamber from central portions of said chamber outwardly towards the edge to prevent the formation of air bubbles between said photosensitive sheet and said cover plate means.

14. Apparatus as recited in claim 13 wherein said cover plate means comprises a transparent cover plate, and wherein said optical imaging system exposes said photosensitive sheet through said transparent cover plate.

15. Apparatus as recited in claim 14 wherein said relatively flexible sheet is hingedly connected to said backing plate member, and wherein said gasket means clamps said relatively flexible sheet against said backing plate member.

* * * * *